United States Patent
Yasui et al.

(10) Patent No.: US 7,680,580 B2
(45) Date of Patent: Mar. 16, 2010

(54) AIR/FUEL RATIO CONTROL APPARATUS OF AN INTERNAL COMBUSTION ENGINE

(75) Inventors: Yuji Yasui, Saitama (JP); Masahiro Sato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 15 days.

(21) Appl. No.: 11/791,278

(22) PCT Filed: Dec. 1, 2005

(86) PCT No.: PCT/JP2005/022500

§ 371 (c)(1),
(2), (4) Date: Jan. 24, 2008

(87) PCT Pub. No.: WO2006/059789

PCT Pub. Date: Jun. 8, 2006

(65) Prior Publication Data

US 2008/0255750 A1 Oct. 16, 2008

(30) Foreign Application Priority Data

Dec. 2, 2004 (JP) .............................. 2004-350275

(51) Int. Cl.
*F02D 41/00* (2006.01)
(52) U.S. Cl. ...................... 701/103; 701/111
(58) Field of Classification Search ......... 701/103–105, 701/111; 123/430–436
See application file for complete search history.

(56) References Cited

U.S. PATENT DOCUMENTS 4,962,741 A 10/1990 Cook et al.
5,005,144 A * 4/1991 Nakajima et al. ............. 702/45
5,144,560 A * 9/1992 Kurihara et al. ............. 701/102
5,709,192 A 1/1998 Zimmermann
6,866,024 B2 * 3/2005 Rizzoni et al. ............... 123/430
7,073,485 B2 * 7/2006 Truscott et al. .......... 123/406.22
7,318,018 B2 * 1/2008 Yasui et al. .................. 701/103
2004/0039507 A1 * 2/2004 Yao et al. ....................... 701/41

(Continued)

FOREIGN PATENT DOCUMENTS

EP 0 416 856 A2 3/1991

(Continued)

OTHER PUBLICATIONS

Summary Plan 2005-2006 OTRC Project, http://otrc.tamu.edu/pages/06RiserVIV.htm.*

(Continued)

*Primary Examiner*—Stephen K Cronin
*Assistant Examiner*—Johnny H Hoang
(74) *Attorney, Agent, or Firm*—Arent Fox LLP

(57) ABSTRACT

Apparatus and method for air/fuel ratio control for smoothening variation of air/fuel ratio among a plurality of cylinders of an internal combustion engine including a sensor for measuring output of the internal combustion engine. A device calculates a correlation function of each cylinder by taking cross-correlation of values measured by the sensor and a reference signal for each cylinder. A device then calculates a smoothing target value which is common for all of the cylinders. Cylinder controllers produce control input to the respective cylinders such that the correlation function converges to the smoothing target value.

20 Claims, 11 Drawing Sheets

U.S. PATENT DOCUMENTS

2005/0121010 A1  6/2005  Kita et al.

FOREIGN PATENT DOCUMENTS

| | | |
|---|---|---|
| FR | 2 817 294 A | 5/2002 |
| JP | 07-083099 A | 3/1995 |
| JP | 7-133738 | 5/1995 |
| JP | 8-028328 | 1/1996 |
| JP | 08-028328 A | 1/1996 |
| JP | 10-054277 | 2/1998 |
| JP | 10-054277 A | 2/1998 |
| JP | 2003-241803 | 8/2003 |

OTHER PUBLICATIONS

Aviation and the Global Atmosphere, http://www.grida.no/publications/other/ipcc%5Fsr/?src=/climate/ipcc/aviation/108.htm?src=%2fclimate%2fipcc%2faviation%25.*

* cited by examiner (a)

(b)

AIR/FUEL RATIO CONTROL APPARATUS OF AN INTERNAL COMBUSTION ENGINE

CROSS-REFERENCE TO RELATED APPLICATION

This application is a National Stage entry of International Application No. PCT/JP2005/022500 filed Dec. 1, 2005, the entire specification claims and drawings of which are incorporated herewith by reference.

TECHNICAL FIELD

The present invention relates to an air/fuel ratio control apparatus of an internal combustion engine. More specifically, the invention relates to an air/fuel ratio control apparatus for smoothening variation of air/fuel ratio among a plurality of cylinders.

BACKGROUND ART

The amount of intake air into a plurality of cylinders deviates from a target value due to aging deterioration of parts of an intake system and a valve gear system of an internal combustion engine. Errors from such deviation are attributed to mechanical elements and vary from cylinder to cylinder, since the cylinders are uniformly controlled such that a uniform air/fuel ratio is realized, the amount of fuel injection into cylinders does not vary. Although each cylinder receives the same target value, the air/fuel ratio differs from cylinder to cylinder.

Especially under a low load condition such as idling operation, influence of error on the intake air amount increases. And the air/fuel ratio largely varies from cylinder to cylinder, deteriorating the exhaust gas purifying rate of a catalyst, which leads to a lower emission performance. If a cylinder receives excessively lean or rich air/fuel ratio, the cylinder may suffer a misfire. Or, since torque largely varies among the cylinders, drivability deteriorates relative to idling vibration and surging. Therefore, there is a need for a control technique capable of detecting variation of intake air amount among the cylinders and of compensating the variation quickly.

Japanese Patent No. 2689368 discloses an observer control for compensating variation of intake air amount based on output of an LAF sensor (air/fuel ratio sensor) mounted on an exhaust system. According to this technique, however, stability with respect to modeling error and dead time is low, and it is difficult to apply this technique when the response of the LAF sensor varies or aging deterioration is large. It is also difficult to apply this technique to a high output/high torque exhaust system (4-2-1 total exhaust system) which includes a large dead time in measuring the air/fuel ratio.

DISCLOSURE OF INVENTION

Hence, there is a need for an air/fuel ratio control technique having high robust performance and high adaptability with respect to types of the exhaust system, variation of sensor characteristics and aging deterioration of the mechanism.

The present invention provides an air/fuel ratio control apparatus for smoothing variation of the air/fuel ratio among a plurality of cylinders of an internal combustion engine. This apparatus includes a sensor for measuring output of the internal combustion engine. The apparatus includes means for calculating a correlation function for each cylinder taking a cross-correlation of a reference signal for each cylinder and a value measured by the sensor. The apparatus also includes means for calculating a smoothing target value which is common to all the cylinders. The apparatus further includes cylinder controllers, each of which is assigned to each one of the cylinders, for producing control input to the respective cylinders so that the correlation function of each cylinder converges to the common smoothing target value. With this configuration, even if there are modeling error and dead time, stable and swift estimation of the air/fuel ratio can be made for each cylinder, and stable and swift convergence of the air/fuel ratio to the target value can be made.

In one embodiment of the present invention, the reference signal is a periodic function, and the cross-correlation is calculated in a range of an integral multiple of the period of the reference signal. With this, vibrating behavior of the correlation function which shows the state of the air/fuel ratio is not included, the control system will not be brought into a resonance state, and the control system will not become unstable.

In one embodiment of the invention, the smoothing target value is a mean value of the correlation function.

In one embodiment of the invention, the control input is produced using a two-degrees-of-freedom response assignment control algorithm. This algorithm makes the air/fuel ratio converge to the target value without producing overshooting and thus, undesired vibration does not appear in the output.

In one embodiment of the invention, the apparatus further comprises common, control means for producing a control input common to the cylinders for making the mean value of the sensor converge to a predetermined output target value. With this, convergence is made without steady-state deviation with respect to the output target value.

In one embodiment of the invention, the common control input is produced using a two-degrees-of-freedom response assignment control algorithm, and a target value response of the common control means is set higher than that of the cylinder controller. With this, the common control means converges faster than the cylinder controller, speedy and precise compensation of the steady-state deviation is made with respect to the output target value.

In one embodiment of the invention, the internal combustion engine is a gasoline engine, the control input to each of the cylinders is a parameter for correcting a fuel injection amount, and the sensor is an exhaust gas sensor (LAF sensor) disposed in an exhaust system. In this case, ignition tiring is corrected in accordance with the parameter, and a correction amount of the ignition timing is proportional to magnitude of a load of the engine. With this, compensation is made for the variation of the air/fuel ratio among the cylinders, and drivability is enhanced as variation of rotation reduces.

In one embodiment of the invention, the internal combustion engine is a diesel engine, the control input to each of the cylinders is a parameter for correcting a fuel injection amount, and the sensor is an angular speed sensor disposed on a crankshaft. With this, the variation of torque among the cylinders is compensated and drivability is enhanced as variation of rotation is reduced.

BEST MODE FOR CARRYING OUT THE INVENTION

Figure 1:
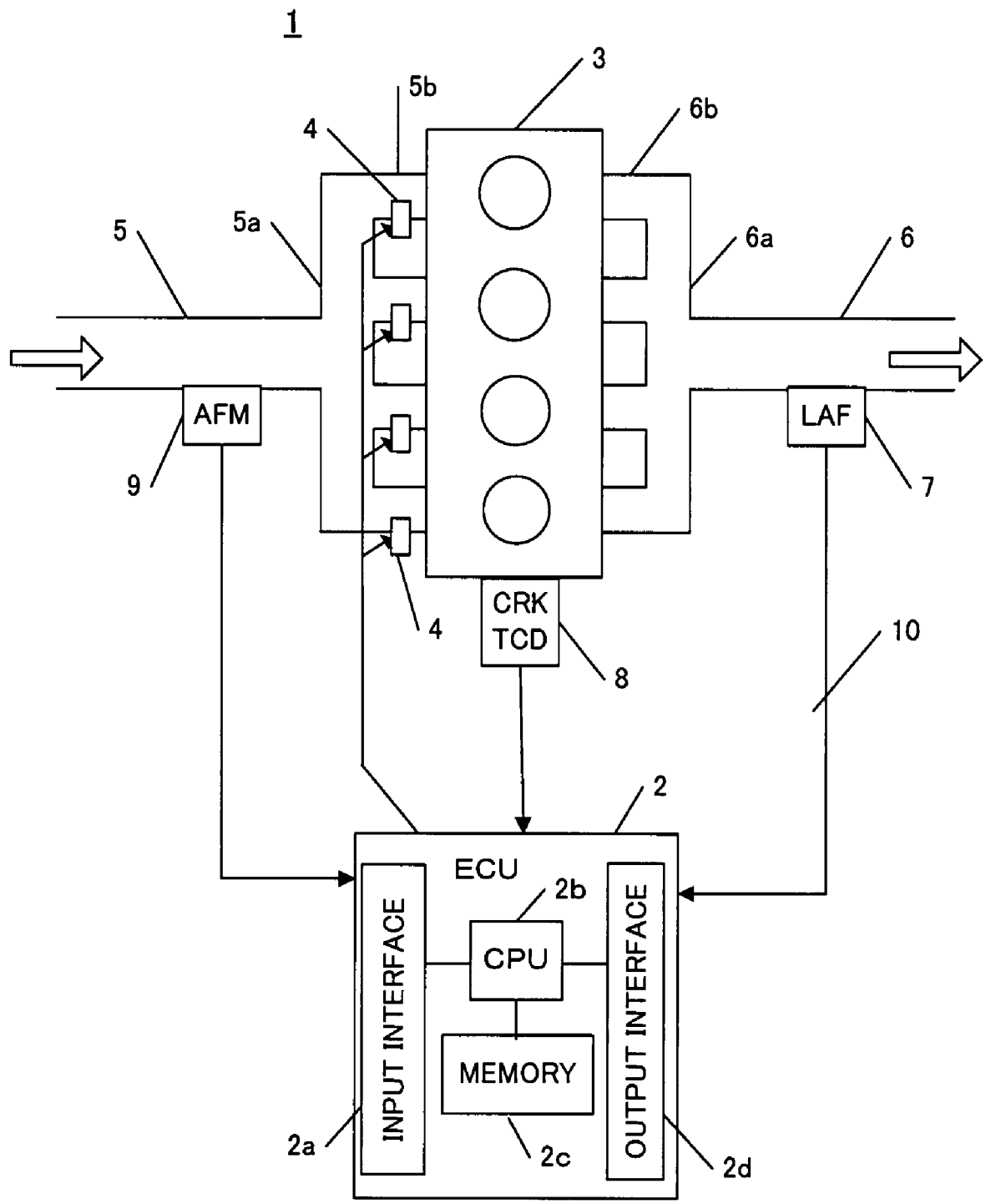
FIG. 1 is a block diagram of an air/fuel ratio control apparatus of an internal combustion engine according to a first embodiment of the present invention.

Embodiments of the present invention will be described with reference to the drawings. FIG. 1 is a block diagram of an air/fuel ratio control apparatus of an internal combustion engine (referred to as "engine") according to a first embodiment of the invention. As shown in FIG. 1, the air/fuel ratio control apparatus 1 includes an ECU 2, which sends a control command to an injector 4 to achieve an average air/fuel ratio of the cylinders of the engine 3.

Figure 3:
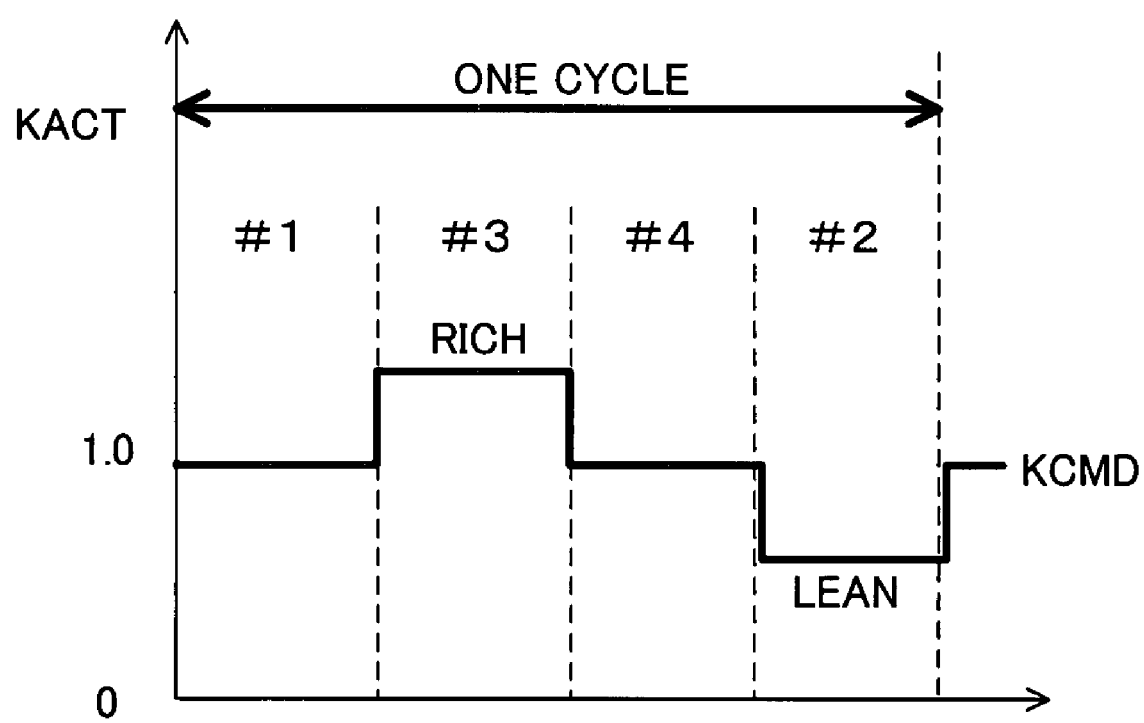
FIG. 3 is a schematic diagram of an LAF sensor output KACT.

As shown in FIG. 3, the engine 3 is a four-stroke (stroke) in-line four-cylinder gasoline engine having four cylinders #1 to #4. A crank angle sensor 8 is mounted on a crankshaft (not shown) of the engine. The crank angle sensor 8 outputs CRK pulse signals and TDC pulse signals to the ECU 2 as the crankshaft rotates. The CRK signal is produced one by one at every predetermined crank angle (e.g., 30°). The ECU 2 calculates the number of revolution (rpm) NE of the engine 3 in accordance with the CRK signal. The TDC signal is a signal which indicates that the piston (not shown) in each cylinder is at a predetermined crank angle position, which is slightly before a TDC position of the air intake stroke. In the case of the four-cylinder engine, the TDC signal is output one by one at every 180 degree of crank angle.

An air intake pipe 5 is connected to the four cylinders #1 to #4 of the engine 3 via four branches 5b of an intake manifold 5a. An injector 4 is mounted on each of the branches 5b. When the engine 3 is operated, fuel injection amount as governed by valve-opening time and fuel injection timing of each injector 4 are controlled by a drive signal from the ECU 2. In the four cylinders #1 to #4, the fuel is injected in the order of #1, #3, #4, and #2. An air flow sensor 9 is mounted upstream from the intake manifold in the intake pipe 5. The air flow sensor 9 sends an electric signal which is proportional to the intake air amount to the intake pipe 5.

An exhaust pipe 6 is connected to the four cylinders of the engine 3 via four branches 6b of an exhaust manifold 6a. In the exhaust pipe 6, an LAF sensor (air/fuel ratio sensor) 7 is mounted in the vicinity of an joint portion of the four branches 6b. The LAF sensor 7 detects oxygen concentration in exhaust gas over a wide range from a rich region to a lean region, and sends to the ECU 2 output KACT which is proportional to detected oxygen concentration. The output KACT represents the air/fuel ratio in the exhaust gas in the vicinity of the joint portion of the exhaust manifold 6a in terms of equivalent ratio.

The ECU 2 is a computer having an input interface 2a for receiving data from various portion of a vehicle, a CPU 2b for performing computation for controlling various portions of the vehicle, and a memory 2c including a read only memory (ROM) and a random access memory (RAM). ECU 2 also includes an output interface 2d for sending control signals to various portions of the vehicle. Computer program and data for performing control of the various portions of the vehicle are stored in the ROM of the memory 2c. A program for carrying out the air/fuel ratio control of the present invention as well as data and tables used when the program is executed are stored in the ROM. The read only memory may be a rewritable ROM such as EEPROM. The RAM provides a working space for operation of the CPU 2b. Data received from the various portions of the vehicle and control signals and data to be sent to the various portions of the vehicle are temporarily stored in the RAM.

In the embodiment, the ECU 2 receives the air/fuel ratio of exhaust gas from the LAF sensor 7 as control input, and calculates an air/fuel ratio correction coefficient of each cylinder based on this control input. The fuel injection amount to each of the cylinders is calculated from the air/fuel ratio correction coefficient and output from the crank angle sensor 8 and the air flow sensor 9. Control command is sent to each injector 4 to realize the fuel injection amount to control an average air/fuel ratio of the four cylinders of the engine 3.

Figure 2:
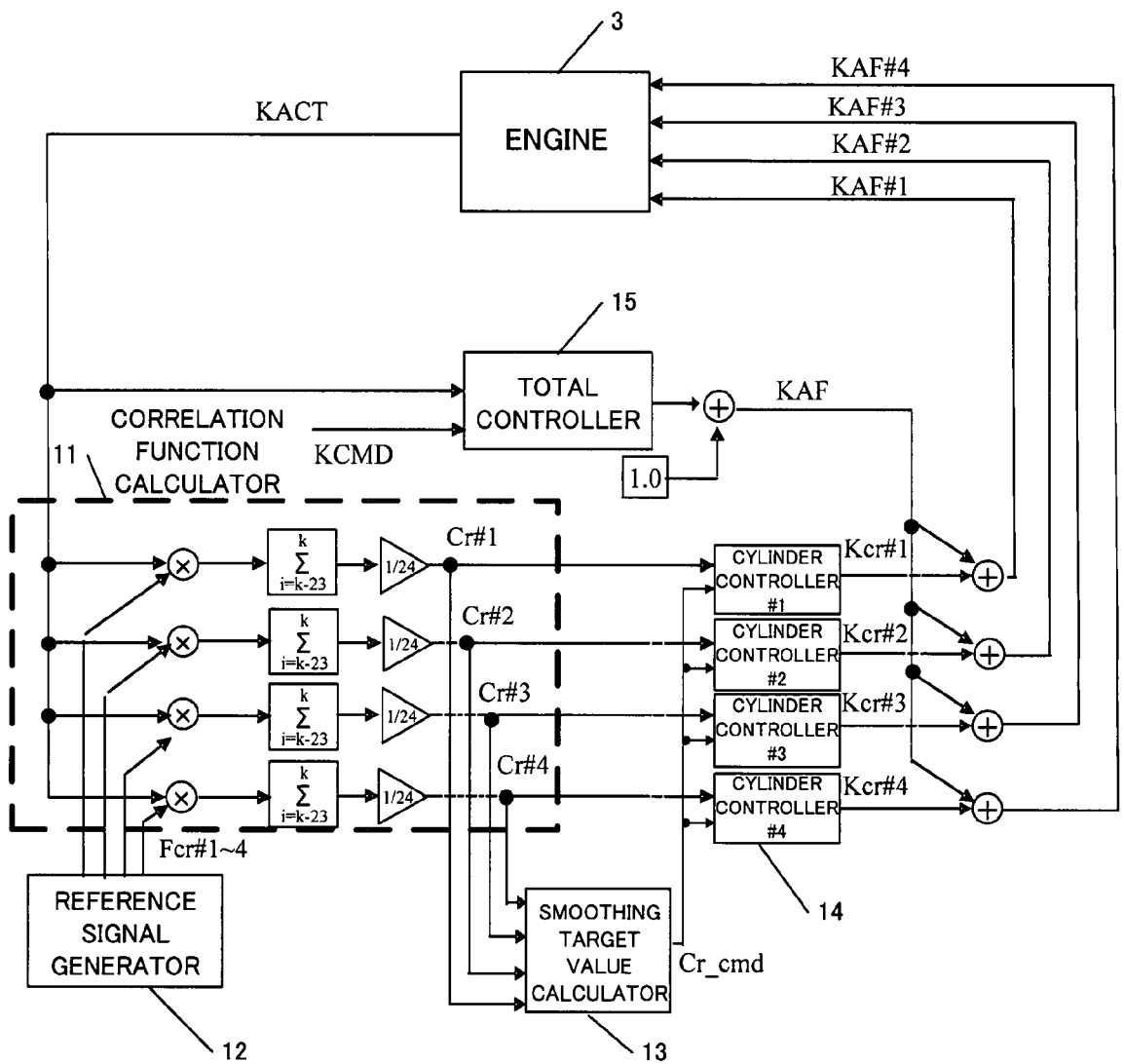
FIG. 2 is a control block diagram of the air/fuel ratio control apparatus shown in FIG. 1.

FIG. 2 is a block diagram of the air/fuel ratio control apparatus 1 of the first embodiment of the invention. As shown in FIG. 2, the air/fuel ratio control apparatus 1 comprises a correlation function calculator 11, a reference signal generator 12, a smoothing target value calculator 13, a cylinder controller 14 and an total controller 15. The object to be controlled is the engine 3.

First, in the LAF sensor 7, output KACT corresponding to the air/fuel ratio of exhaust gas is measured. In the reference signal generator 12, reference signals Fcr #1 to #4 which are modeled after discharge behavior of exhaust gas in the cylinders are generated in synchronization with crank signal CRK (every 30° in this embodiment).

Correlation function calculator 11 calculates a correlation function Cr in a finite range of the LAF sensor output KACT and reference signal Fcr based on the following equation.

$$Cr\#i(k) = \frac{1}{N}\sum_{j=k-N+1}^{k} Fcr\#i(j) \cdot KACT(j) \qquad (1)$$

Wherein i represents cylinder number (i=1 to 4 in the case of a four cylinder engine), and N represents the number of CRK signal pulses in one combustion cycle. As the CRK signal pulse is produced every 30 degrees of the crank angle, N is 24. Further, k represents time step.

Figure 4:
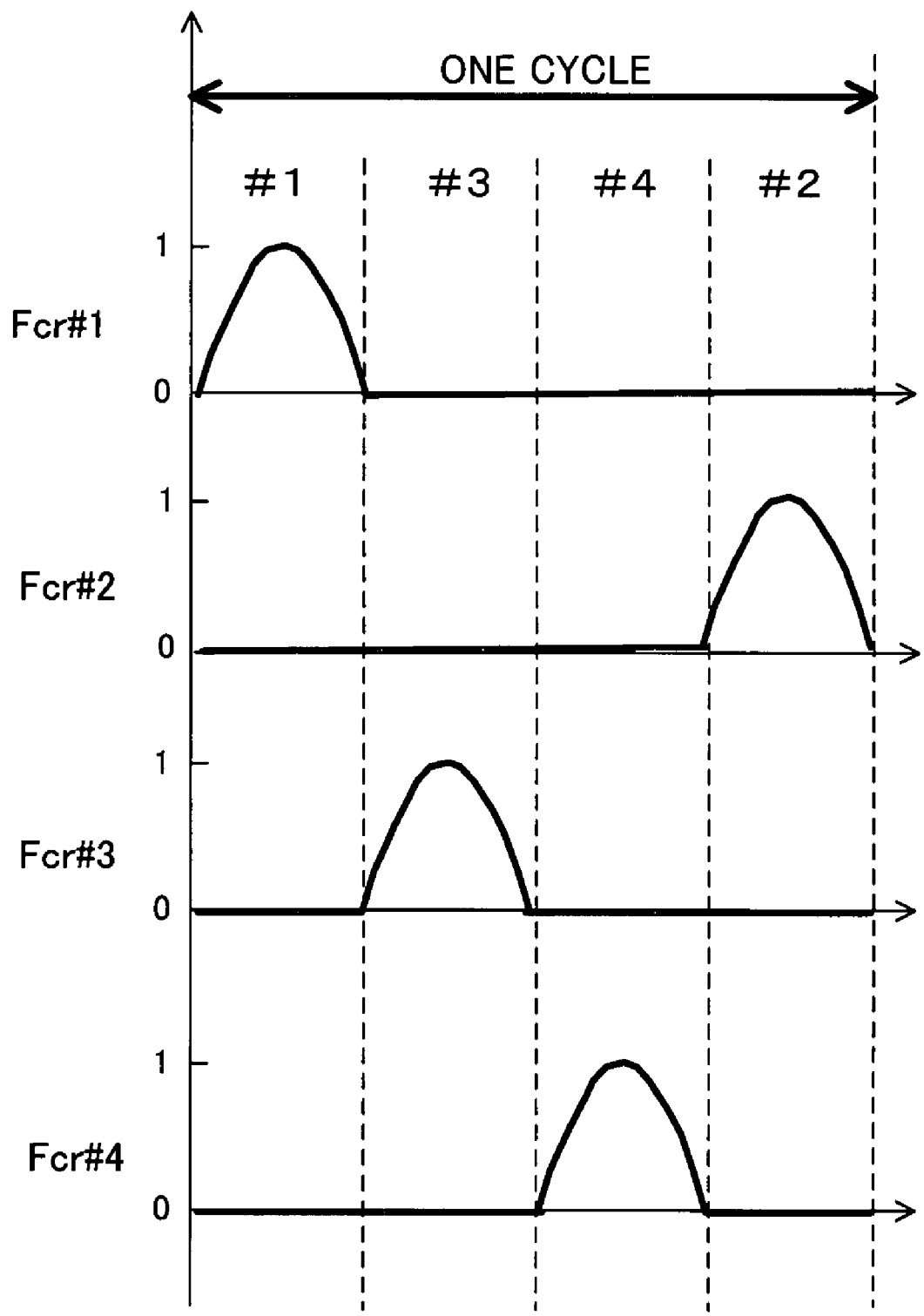
FIG. 4 is a schematic diagram of a reference signal.

Now, the LAF sensor output KACT and the reference signal Fcr#i will be described with reference to FIGS. 3 and 4. FIG. 3 is a schematic diagram of the LAF sensor output KACT. In FIG. 3, KACT and KCMD are shown in terms of equivalent ratios. For the theoretical air/fuel ratio (e.g., 14.5), KCMD is 1. When the air/fuel ratio is richer than the theoretical air/fuel ratio, KCMD is higher than 1, and when the air/fuel ratio is leaner than the theoretical air/fuel ratio, KCMD is lower than 1. In FIG. 3, the cylinder #3 shows LAF sensor output KACT in a rich state, and the cylinder #2 shows LAF sensor output KACT in a lean state. Since the exhausting timing is determined by the fuel injection timing of each cylinder, when the cylinder is rich or lean, the LAF sensor output KACT takes periodic variation.

The reference signal Fcr#i is produced taking such characteristics of the LAF sensor output KACT into account. FIG. 4 is a schematic diagram of the reference signal Fcr#i. The reference signal Fcr#i is produced for each of the cylinders to reflect the behavior of exhaust gas from each cylinder in one combustion cycle. A reference signal of each cylinder has a sine waveform in the exhaustion stroke of subject cylinder. By using such reference signals, the correlation function Cr#i becomes larger as the air/fuel ratio of the corresponding cylinder i becomes richer, and becomes smaller as the air/fuel ratio becomes leaner. Take the correlation function based on the LAF sensor output KACT shown in FIG. 3 for example, a correlation function Cr#3 with reference signal Fcr#3 of the cylinder #3 takes a maximum value, and a correlation function Cr#2 with the reference signal Fcr#2 of the cylinder #2 takes a minimum value.

Here, the reference signal Fcr is a periodic signal in which one combustion cycle of the engine 3 is one period. Generally, the cross-correlation of the periodic signal is characterized in that if a cross-correlation of the periodic signal is calculated in a finite section other than integral multiple of the period of the periodic signal, the cross-correlation exhibits a periodic behavior, and if the cross-correlation is calculated in a finite range of the integral multiple of the period of the periodic signal, the cross-correlation exhibits a constant value. To prevent resonance of the control system, it is preferable that an internal variable in the control system does not include periodic behavior. The integration range is set to the same as the period of the reference signal so that the correlation function Cr#i does not include periodic behavior.

In a smoothing target value calculator 13, a smoothing target value Cr_cmd for smoothening the air/fuel ratios of the four cylinders is calculated. Take the relation between the correlation function Cr#i and the air/fuel ratio of each cylinder for example, if the air/fuel ratios of the cylinders match each other, this means that the correlation functions Cr#i of the cylinders match each other. In this embodiment, the smoothing target value Cr_cmd for converging the correlation functions Cr#i of the cylinders is a mean value of correlation functions as shown in the following equation.

$$Cr\_cmd(k) = \frac{1}{m}\sum_{i=1}^{m} Cr\#i(k) \quad (2)$$

Here, m represents the number of cylinders, and is 4 in this embodiment.

In the cylinder controller 14, a smoothing coefficient Kcr#i for each cylinder for adjusting the fuel injection amount to the cylinder is obtained for converging the correlation function Cr#i of each cylinder to the smoothing target value Cr_cmd. To produce the cylinder smoothing coefficient, two-degrees-of-freedom response assignment control is used. A merit of using this control technique is that, when the smoothing target value Cr_cmd abruptly varies or when the correlation function Cr#i largely deviates from the smoothing target value Cr_cmd, variation of the air/fuel ratio among the cylinders can stably be corrected and deterioration of emission and drivability can be prevented without generating overshoot and vibration behavior.

In the cylinder controller 14, the smoothing target value Cr_cmd is low-pass filtered using the target value response assignment parameter Rcr as shown in equation (3). With this process, the waveform of the target value varying in a step manner is smoothed, and is converted into a curve which gradually converges to the target value.

$$Cr\_cmd\_f(k) = -Rcr \cdot Cr\_cmd\_f(k-1) + (1+Rcr) Cr\_cmd(k) \quad (3)$$

Here, Cr_cmd_f represents a target value after filtering, and k represents time step. The response assignment parameter is set in a range of $-1 < Rcr < 0$.

As shown in the equation (3), a track of the target value Cr_cmd_f after filtering is defined by the target value response assignment parameter Rcr. Tracking speed of the correlation function Cr#i to the target value Cr_cmd can be designated by setting the target value to a desired track. The cylinder controller 14 calculates the smoothing coefficient Kcr#i for each cylinder such that the correlation function Cr#i converges to the target value Cr_cmd_f which is set in this manner.

Deviation Ecr#i between the correlation function Cr#i and the target value Cr_cmd_f can be expressed by the following equation (4).

$$Ecr\#i(k) = Cr\#i(k) - Cr\_cmd\_f(k) \quad (4)$$

As shown in equation (5), a switching function σcr#i is defined. The switching function σcr#i defines converging behavior of the deviation Ecr#i. Here, Scr represents a disturbance suppressing response assignment parameter, and defines a converging speed of the deviation Ecr#i when disturbance exists. The disturbance suppressing response assignment parameter Scr is set to satisfy the relation of $-1 < Scr < 0$.

$$\sigma cr\#i(k) = Ecr\#i(k) + Scr \cdot Ecr\#i(k-1) \quad (5)$$

Lastly, smoothing coefficient Kcr#i for each cylinder is calculated as shown in equation (6). Here, Kch_Cr and Kadp_cr are feedback gains. A first term of a right side of the equation (6) is a proportional term, and a second term is an integration term. That is, the equation (6) is equivalent to calculating a feedback amount in PI control with an input of switching function σcr#i.

$$Kcr\#i(k) = -\text{Krch\_cr} \cdot \sigma cr\#i(k) - \text{Kadp\_cr} \cdot \sum_{j=0}^{k} \sigma cr\#i(j) \quad (6)$$

The smoothing coefficient Kcr#i for each cylinder calculated in this manner is a correction input for making the correlation function Cr#i match the smoothing target value Cr_cmd. The coefficient Kcr#i is not a control amount for controlling the LAF sensor output KACT to the target air/fuel ratio KCMD. It produces stationary deviation between the LAF sensor output KACT and the target air/fuel ratio KCMD except when the smoothing target value Cr_cmd matches the target air/fuel ratio KCMD.

Therefore, in this embodiment, in addition to the cylinder controller 14, the total controller 15 for converging the LAF sensor output KACT to the target air/fuel ratio KCMD is further used. The algorithm of the total controller 15 can also be realized by the PID control, adaptation control or optimizing control. In this embodiment, the two-degrees-of-freedom response assignment control is used as in the cylinder controller 14.

The response of the target value and the disturbance suppressing ability of the total controller 15 are set faster than that of the cylinder controller to quickly and precisely compensate the stationary deviation.

As can be seen from equation (7), in the total controller 15, the target air/fuel ratio KCMD is low-pass filtered using a target value response assignment parameter R. With this process, the target value waveform which varies in a step manner is smoothed and converted into a curve which gradually converges to the target value.

$$KCMD\_f(k) = -R \cdot KCMD\_f(k-1) + (1+R)KCMD(k) \quad (7)$$

Here, KCMD_f represents a target value after filtering, and k represents time step. The response assignment parameter is set in a range of $-1 < Rcr < R < 0$ so as to increase the speed higher than that of the cylinder controller 14.

A deviation E between the LAF sensor output KACT and the target value KCMD_f is expressed by equation (8).

$$E(k) = KACT(k) \cdot KCMD\_f(k) \quad (8)$$

The switching function ca is defined by equation (9). Here, S represents a disturbance suppressing response assignment parameter and defines a converging speed of the deviation E when disturbance exists. The disturbance suppressing response assignment parameter S is set to satisfy the relation of $-1 < Scr < S < 0$ for increasing the speed higher than the cylinder controller 14.

$$\sigma(k) = E(k) + S \cdot E(k-1) \quad (9)$$

Lastly, as shown in equation (10), air/fuel ratio correction coefficient KAF is calculated. Here, Krch and Kadp are feedback gains.

$$KAF(k) = 1 - Krch \cdot \sigma(k) - Kadp \cdot \sum_{j=0}^{k} \sigma(j) \quad (10)$$

In the equation (10), "1" is added to a first term in a right side as compared with the equation (6). The initial values of second and third terms in the right side are zero at the start of a control. The correction coefficient and the fuel injection amount should not be zero. The initial value of the third term, an integration term, may be set to 1, and "1" in the first term may be omitted.

The air/fuel ratio control apparatus 1 lastly adds air/fuel ratio correction coefficient KAF to the smoothing coefficient K for each cylinder to calculate air/fuel ratio correction coefficient KAF#i for each cylinder.

$$KAF\#i(k) = Kcr\#i(k) + KAF(k) \quad (11)$$

The fuel injection amount of the injector 4 is adjusted by the air/fuel ratio correction coefficient KAF#i for each cylinder, and the air/fuel ratio of each cylinder is smoothed.

Figure 5:
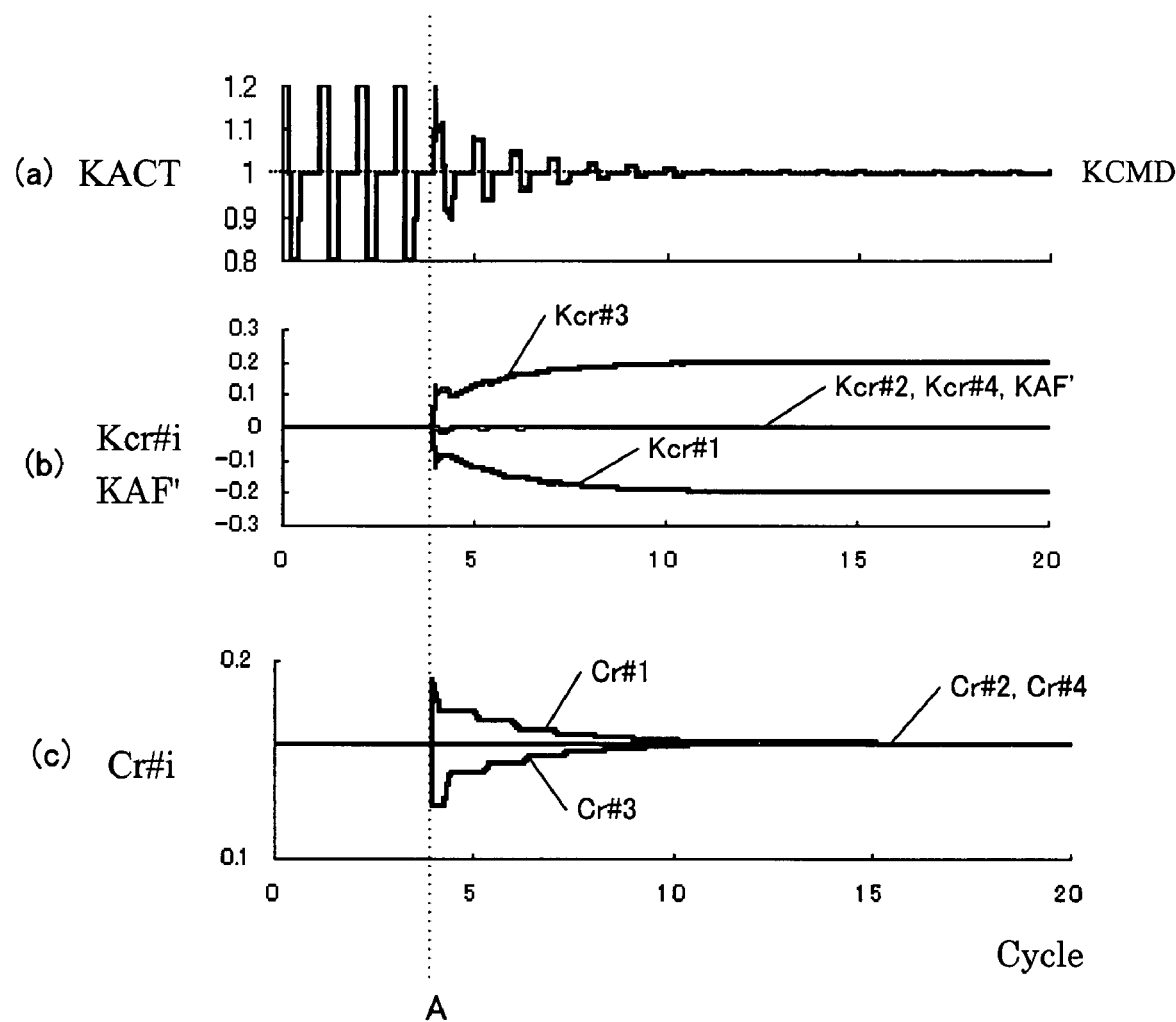
FIG. 5 illustrates a simulation result of the air/fuel ratio control apparatus of the first embodiment of the invention.
Figure 8:
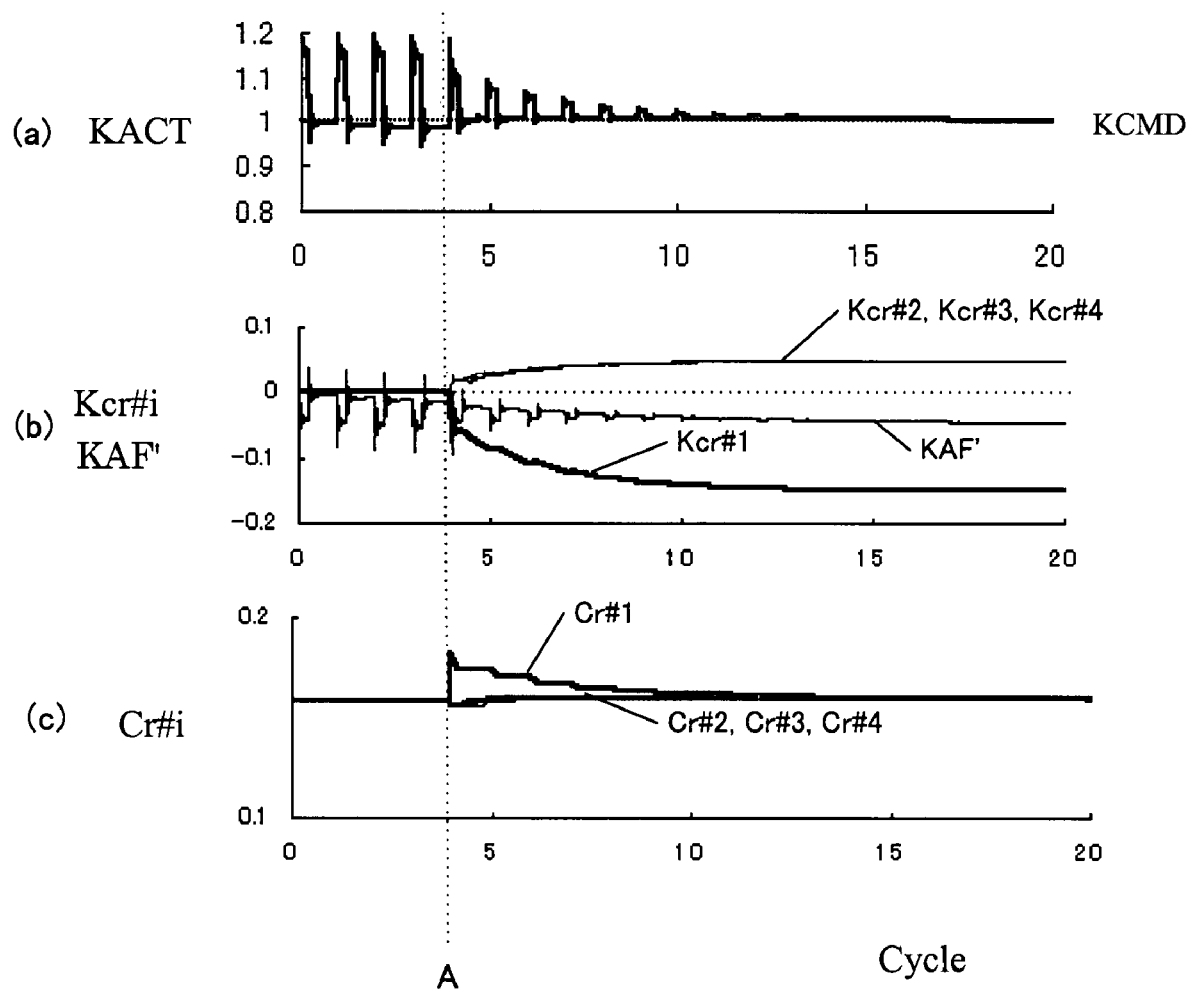
FIG. 8 illustrates a simulation result of the air/fuel ratio control apparatus of the first embodiment of the invention.

In FIG. 5, (a), (b) and (c) and in FIG. 8, (a), (b) and (c) illustrate simulation results of the air/fuel ratio control apparatus according to the first embodiment. Graphs (a) in FIGS. 5 and 8 illustrate LAF sensor output KACT, graphs (b) illustrate smoothing coefficient Kcr#i for each cylinder and outputs KAF' of the total controller 15 (second and third term in the right side in the equation (10)), and graphs (c) illustrate correlation function Cr#i.

Figure 6:
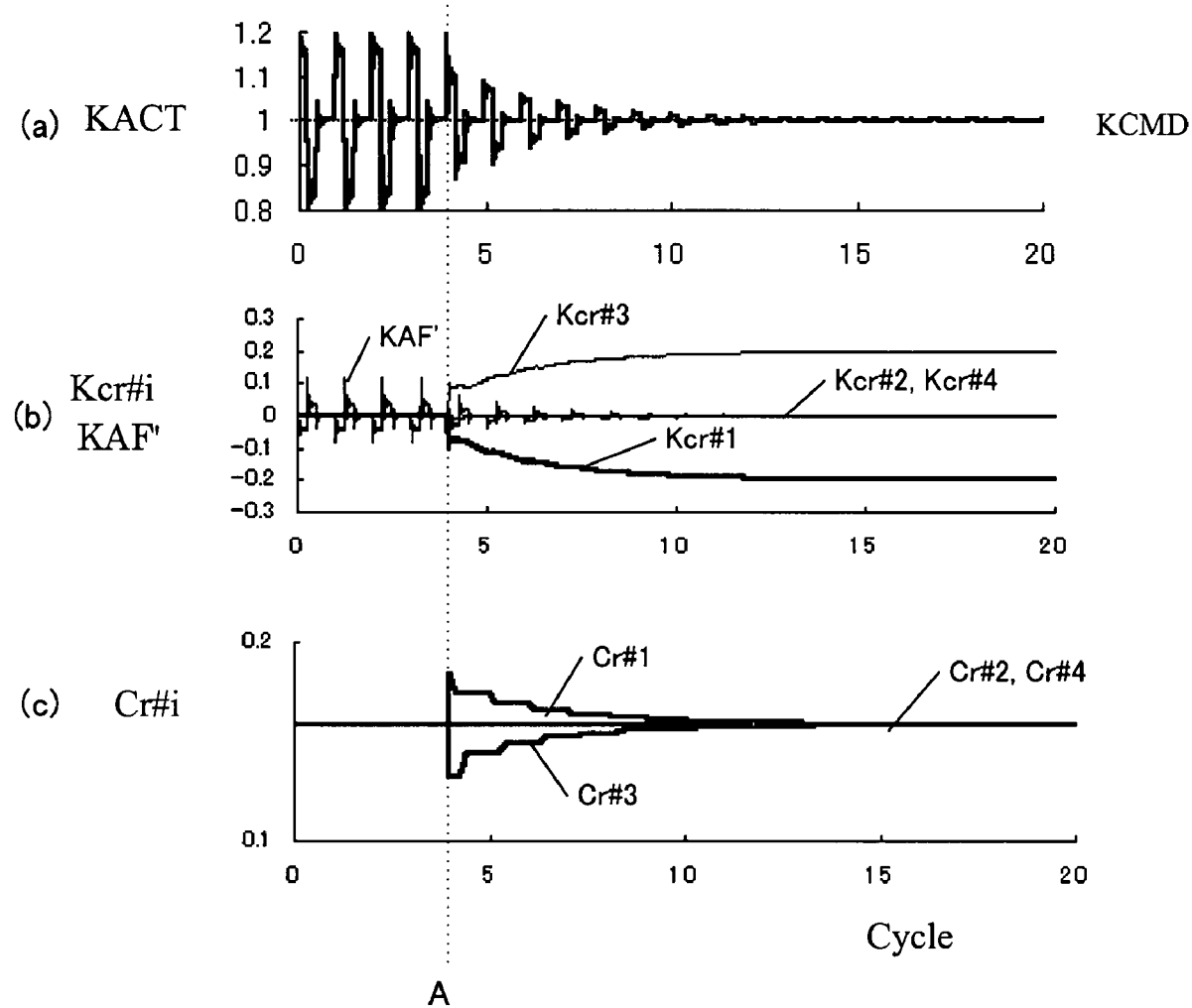
FIG. 6 illustrates a simulation result of the air/fuel ratio control apparatus of the first embodiment of the invention.

FIGS. 5 and 6 illustrate simulation results with respect to the LAF sensor output KACT when cylinder #1 is 20% rich and cylinder #3 is 20% lean. FIG. 5 illustrates the result without the total controller 15, and FIG. 6 illustrates the result with the total controller 15.

As shown in FIG. 5, immediately after the start of control (time A), correlation coefficient Cr#1 of cylinder #1 in a rich state is larger than correlation coefficients Cr#2 and Cr#4 of cylinders #2 and #4. Correlation coefficient Cr#3 of cylinder #3 in a lean state is smaller than correlation coefficients Cr#2 and Cr#4. As the control proceeds, the smoothing coefficient Kcr#1 of cylinder #1 is increased in a negative direction to resolve rich, and cylinder smoothing coefficient Kcr#3 of cylinder #3 is increased in a positive direction to resolve lean. With this, the correlation coefficients Cr#1 and Cr#3 are gradually converted to C#2 and Cr#4 in a normal state. At the same time, the LAF sensor output KACT stabilizes toward the target air/fuel ratio KCMD.

In the case of FIG. 5, since there is no total controller, KAF' is always equal to zero, and the air/fuel ratio correction coefficient KAF is always one. However, even if there is no correction by the total controller, the LAF sensor output KACT converges to the target air/fuel ratio KCMD. This is because the rich and lean ratios of cylinders #1 and #3 are 20% respectively, and the increasing rate of the correlation coefficient Cr#1 and the reducing rate of the correlation coefficient Cr#3 are substantially the same. The smoothing target value Cr_cmd, which is a mean value, becomes zero. Thus, the correction by the total controller 15 is not needed.

FIG. 6 shows a result with total controller 15 under the same condition as FIG. 5. Behaviors of the parameters of cylinders #1 and #3 and LAF sensor output KACT are almost the same as those in FIG. 5.

Figure 7:
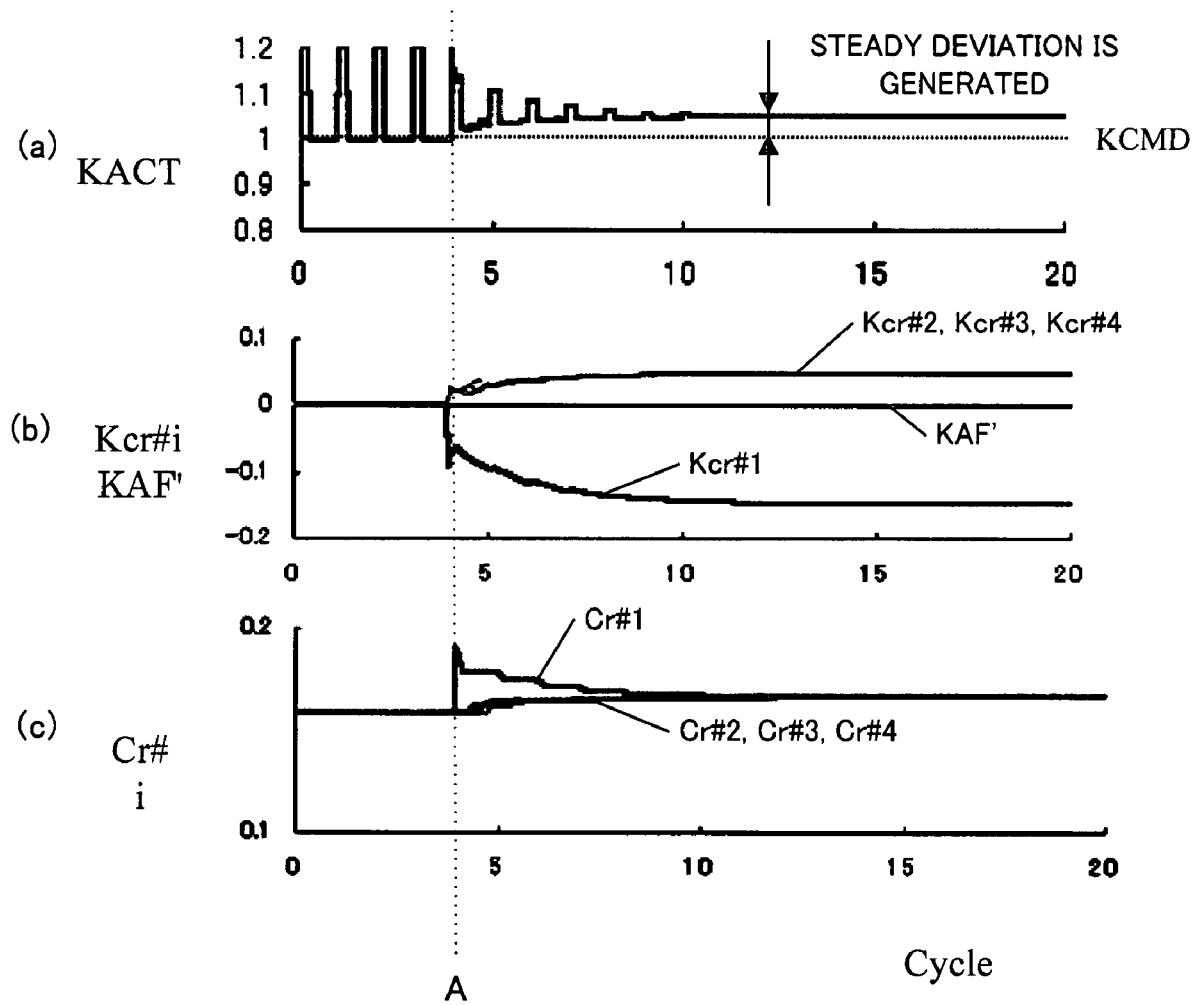
FIG. 7 illustrates a simulation result of the air/fuel ratio control apparatus of the first embodiment of the invention.

FIGS. 7 and 8 show simulation result with the LAF sensor output KACT when the cylinder #1 is in a 20% rich condition. FIG. 7 show the result without total controller 15. FIG. 8 shows the result with total controller 15.

As can be seen in FIG. 7(c), immediately after the start of control (time A), correlation coefficient Cr#1 of the cylinder #1 in the rich state is larger than correlation coefficients Cr#2 and Cr#4 of the cylinders #2 and #4. The smoothing target value Cr_cmd in this case is the mean value of the correlation coefficients. Thus, the smoothing target value Cr_cmd assumes a value between the correlation coefficient Cr#1 in the rich state and the correlation coefficients Cr#2 to Cr#4 in the normal state. That is, the smoothing target value Cr_cmd in this case is in a slightly rich state. As the control proceeds, the cylinder smoothing coefficient Kcr#1 of the cylinder #1 increases in a negative direction to resolve the rich state. The cylinder smoothing coefficients Kcr#2 through Kcr#4 of the cylinders #2 through #4 increase in the positive direction to converge the correlation coefficient to the smoothing target value. Finally, all of the correlation coefficients converge to the slightly rich smoothing target value Cr_cmd. Thus, the LAF sensor output KACT does not completely converge to the target air/fuel ratio KCMD, leaving stationary deviation.

FIG. 8 show the result of simulation involving total controller 15. In FIG. 7, the stationary deviation remains on the rich side in the LAF sensor output KACT. Since the output KAF' takes a negative value with the total controller 15 to resolve the rich, the stationary deviation of the LAF sensor output KACT is corrected and convergence is made to the target air/fuel ratio KCMD.

As described above, the air/fuel ratio control apparatus of the embodiment of this invention has ability to satisfy both compensation of the stationary deviation between the LAF sensor output KACT and the target air/fuel ratio KCMD, and compensation of variation of the air/fuel ratios among the cylinders.

Figure 9:
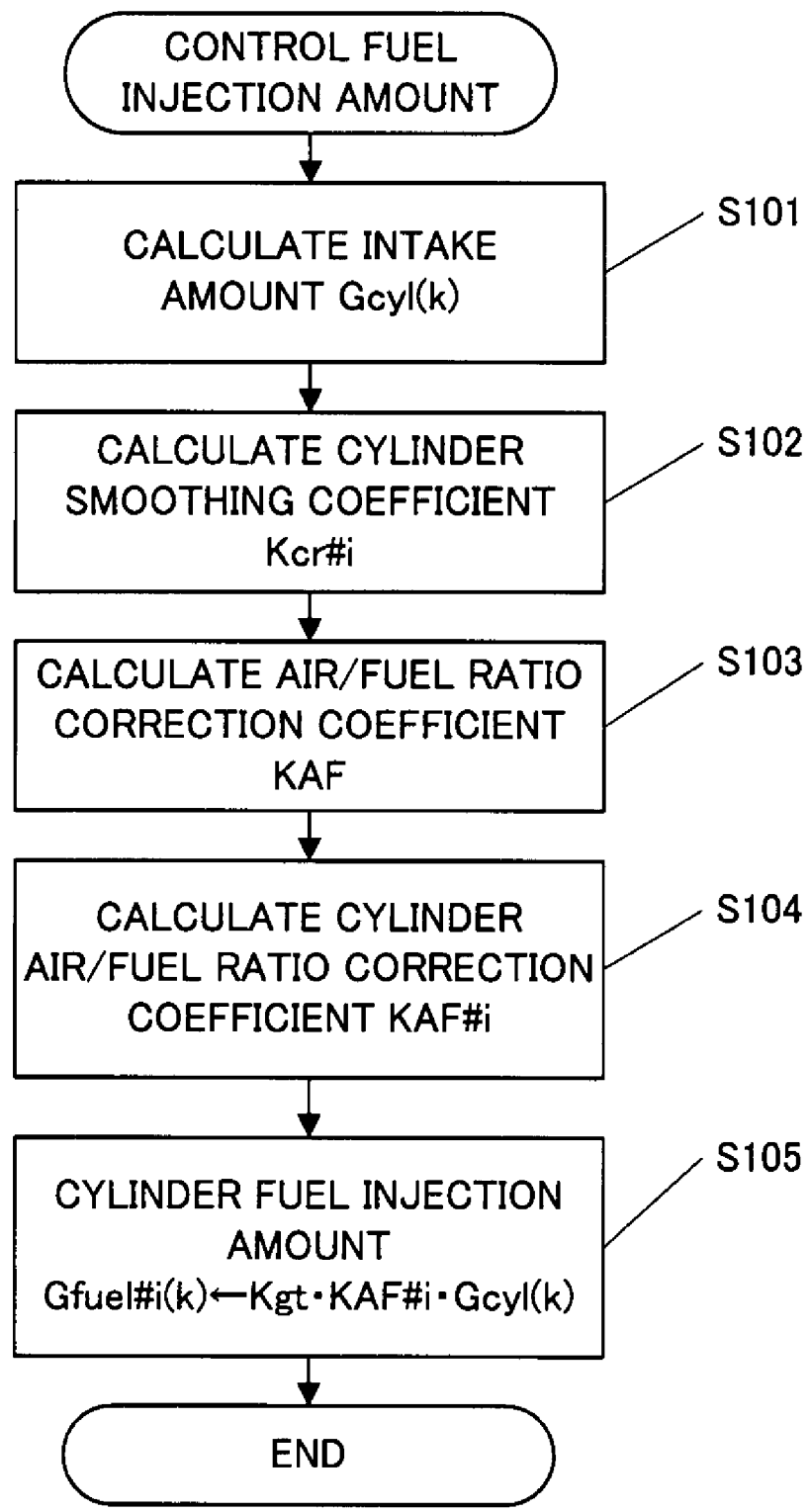
FIG. 9 is a flowchart showing fuel injection amount control processing including the air/fuel ratio control of the first embodiment of the invention.

FIG. 9 is a flowchart showing fuel injection amount control including the air/fuel ratio control of the embodiment of the invention. This process is carried out by the ECU 2.

In step S101, an air intake amount Gcyl of each cylinder is calculated. This is calculated from equation (12) based on output Gin_afm of the air flow sensor 9 and the engine revolution number NE (rpm) calculated by the CRK signal.

$$Gcyl(k)=60 \cdot Gin\_afm/(2 \cdot NE) \tag{12}$$

In step S102, smoothing coefficient Kcr#i for each cylinder is calculated. This is obtained using the equations (1) to (6) in the correlation function calculator 11 and the cylinder controller 14.

In step S103, air/fuel ratio correction coefficient KAF is calculated. This is obtained using the equations (7) to (10) in the total controller 15.

In step S104, cylinder air/fuel ratio correction coefficient KAF#i is control apparatus. This is obtained using the equation (11).

In step S105, a fuel injection amount Gfuel#i(k) of each cylinder is calculated. This is obtained from the equation (13) using a conversion coefficient Kgt for calculating the fuel injection amount from the intake amounts Gcyl(k) and Gcyl, and using the calculated cylinder air/fuel ratio correction coefficient KAF#i.

$$Gfuel\#i(k)=Kgt \cdot KAF\#i \cdot Gcyl(k) \tag{13}$$

The fuel injection amount Gfuel#i(k) may be retrieved from a predetermined non-linear table.

Figure 10:
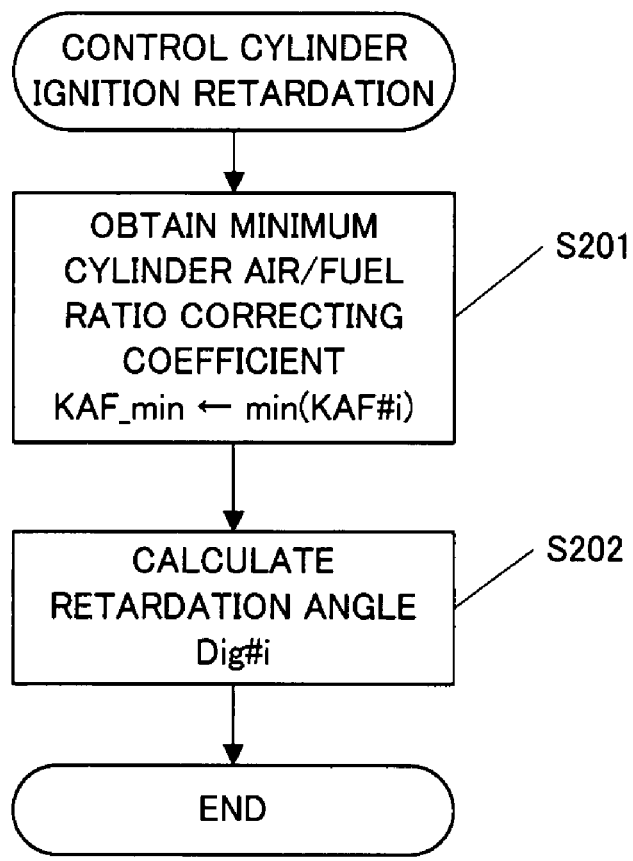
FIG. 10 includes a flowchart showing cylinder ignition retard control which can be executed together with the fuel injection amount control.
Figure 10:
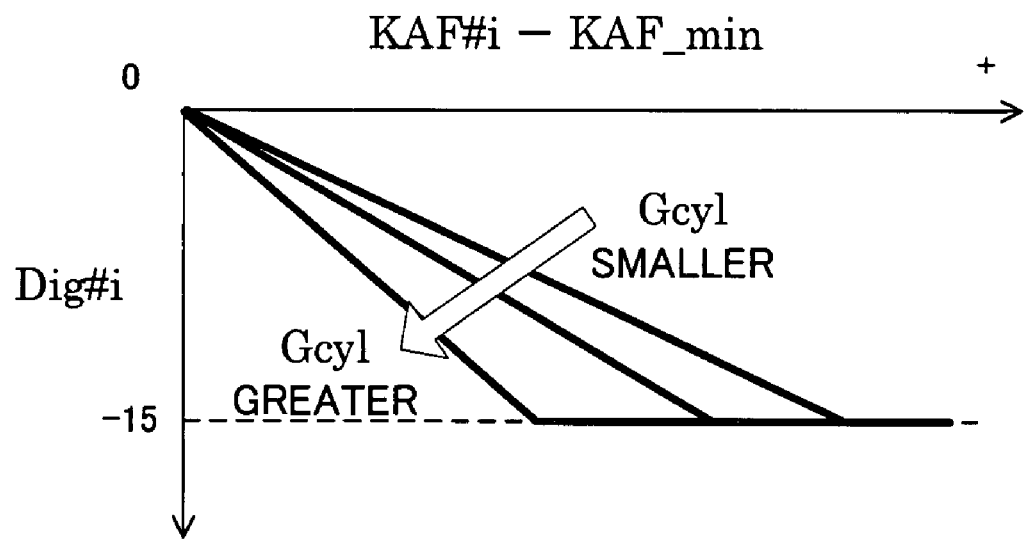

FIG. 10 is a flowchart showing cylinder ignition retard control which can be executed together with the fuel injection amount control. If difference of the air/fuel ratio correlation coefficients among the cylinders during the air/fuel ratio control is large, output torque generated by each cylinder differs, leading to deterioration of drivability. The variation of torque among the cylinders may be suppressed by retarding the ignition timing of the cylinder needing a large correction.

In step S201, a minimum value is selected from air/fuel ratio correction coefficient KAF#i for each cylinder which is calculated by the air/fuel ratio control apparatus 1. The minimum value is referred to as KAL_min, which works as a reference for retard control.

In step S202, retard angle Dig#i is calculated for each cylinder. First, a difference between the air/fuel ratio correction coefficient KAF#i and KAF_min of each cylinder is obtained. The retard angle Dig#i is obtained using a map shown in FIG. 10B by this value. If the cylinder air/fuel ratio correction coefficient KAF#i is larger than the KAF_min, this means the increasing rate of the fuel injection amount is also large, and the torque also increases. Thus, the retard angle of the ignition timing is increased in accordance with the magnitude of the difference with respect to the KAF_min, thereby moderating the variation of torque among the cylinders. As the intake amount Gcyl is larger, the torque increasing amount becomes larger. Thus, the retard angle is increased as shown in FIG. 10B. However, abnormal retard angle raises the exhaust gas temperature, and the catalyst and the exhaust system are damaged. Thus, retard angle larger than a predetermined value (e.g., −15°) should not be used.

Now, a second embodiment of the present invention for a diesel engine will be described. Since fuel is injected from the injector under high pressure in the diesel engine, a fuel injection hole of the injector tends to be worn out, and there is a tendency that the actual fuel injection amount with respect to the valve opening time command value of the injector increases with time. This increasing tendency varies from injector to injector.

In a diesel engine, torque is not adjusted by the air intake amount control with a valve or a throttle. Rather, torque is controlled by increasing or reducing the fuel injection amount. That is, torque in each cylinder is determined by the fuel injection amount. Hence, in the injector of each cylinder, if the fuel injection amount characteristics with respect to the valve opening time command value vary, torques of the cylinders also vary, deteriorating drivability due to surging and the like.

Therefore, a technique capable of compensating the variation of the flow rate characteristics of the injector is desired. The air/fuel ratio control apparatus of the present invention can be used to meet the requirement.

In the case of the diesel engine, the variation in the fuel injection amount appear as periodical variation of the LAF sensor output mounted on the exhaust system. Thus, the LAF sensor is disposed in the exhaust system, and the same control technique as that of the first embodiment can also be applied.

However, the case of the diesel engine has a feature that the increase in the fuel injection amount directly increases or reduces the torque. If attention is paid to this feature, if the fuel injection amount is increased, torque is also increased and with this, the angular speed of the crank also increases. If the fuel injection amount is reduced, the torque and the angular speed of the crank reduce. That is, the variation of the fuel injection amount of each cylinder appears as periodic variation of the angular speed Wcrk of the crank.

Therefore, in this embodiment, the LAF sensor is not used, and the fuel correlation coefficient is calculated based on the angular speed Wcrk of the crank.

Figure 11:
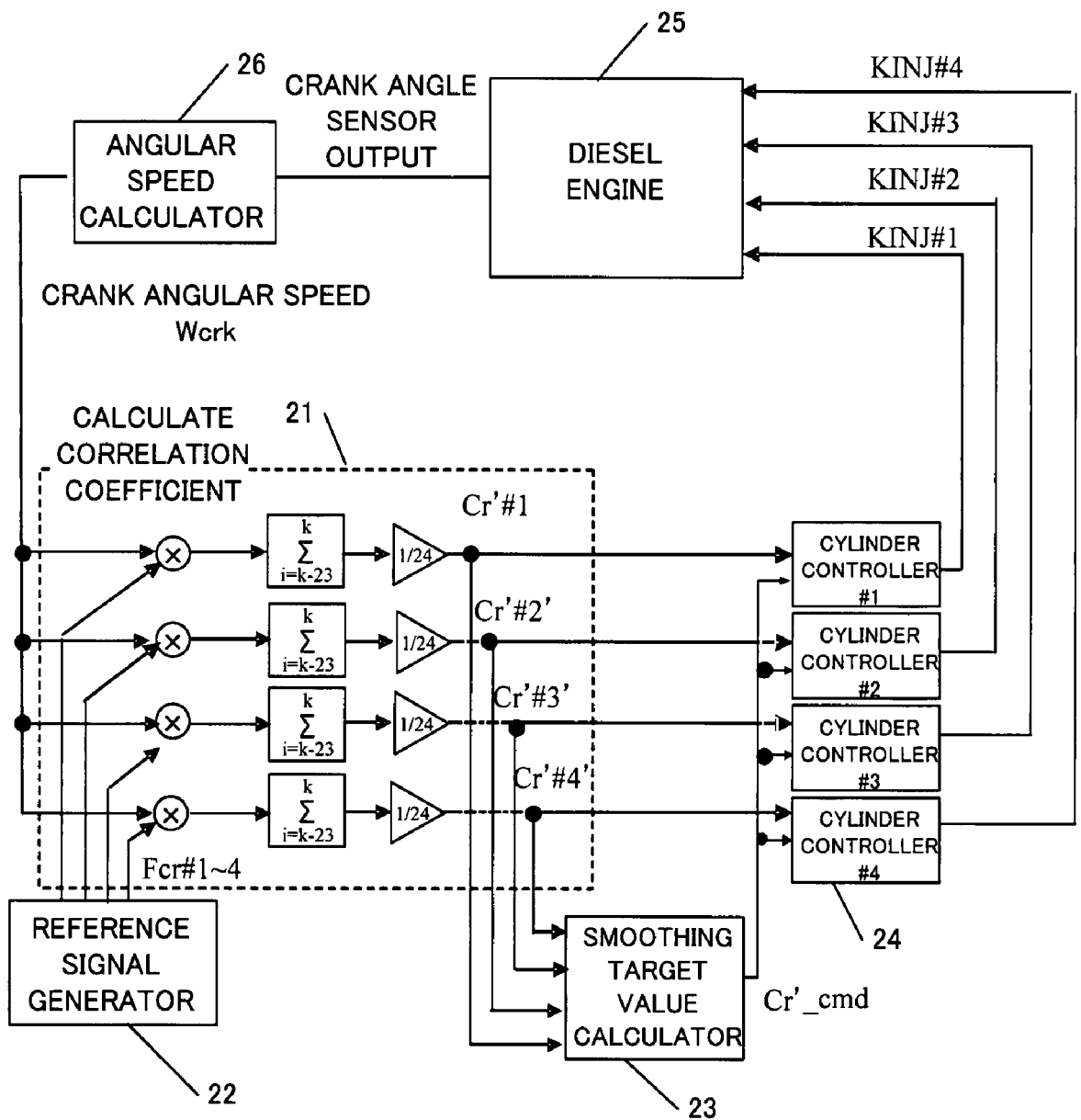
FIG. 11 is a control block diagram of an air/fuel ratio control apparatus according to a second embodiment to the invention in which a diesel engine is to be controlled.

FIG. 11 is a control block diagram of an air/fuel ratio control apparatus according to the second embodiment of the invention.

As shown in FIG. 11, in this embodiment, a cylinder fuel correction coefficient KINJ#i is calculated from the angular speed Wcrk of the crank. Functions of a correlation function calculator 21, a reference signal generator 22, a smoothing target value calculator 23 and a cylinder controller 24 are the same as those of the elements having the same names in the first embodiment.

First, a CRK signal is measured from the crank angle sensor mounted on the crank of an engine 25, and a crank angular speed Wcrk is calculated by an angular speed calculator 26 based on this signal.

Next, in the reference signal generator 22, reference signals Fcr#1 to #4 which are modeled after behavior of output torque by each cylinder are produced in synchronization with the CRK signal.

In the correlation function calculator 21, a correlation function Cr' of the finite range of the crank angular speed Wcrk and the reference signal Fcr is calculated using the following equation.

$$Cr'\#i(k) = \frac{1}{N} \sum_{j=k-N+1}^{k} Fcr\#i(j) \cdot Wcrk(j) \tag{14}$$

Here, i represents cylinder number (i=1 to 4 in the case of a four-cylinder engine), and N represents the number of CRK signal pulses per one combustion cycle. In this embodiment, since the CRK signal is measured every 30°, N is equal to 24. Further, k represents time step.

Next, in the smoothing target value calculator 23, a smoothing target value Cr'_cmd for smoothening the fuel injection amount of each cylinder is calculated. The smoothing target value Cr'_cmd is defined by a mean value of each correlation function as shown in the following equation.

$$\text{Cr}'\_\text{cmd}(k) = \frac{1}{m}\sum_{i=1}^{m} Cr' \# i(k) \quad (15)$$

Here, m represents the number of cylinders, and m is equal to 4 in this embodiment.

Next, in the cylinder controller 24, a cylinder fuel correction coefficient KINJ#i for adjusting the fuel injection amount for each cylinder is obtained such that the correlation function Cr#1 of each cylinder converges to the smoothing target value Cr'_cmd. For producing the cylinder fuel correction coefficient, the two-degrees-of-freedom response assignment control is used as in the first embodiment.

In the cylinder controller 24, the smoothing target value Cr'_cmd is subjected to the low-pass filtering using a target value response assignment parameter R" as shown in equation (16).

$$Cr'\_cmd\_f(k) = -R'' \cdot Cr\_cmd\_f(k-1) + (1+R'')cr'\_cmd(k) \quad (16)$$

Here, Cr'_cmd_f represents a target value after the filtering process, and k represents time step. The response assignment parameter is set in a range of $-1 < R'' < 0$.

Next, a deviation E"#i between the correlation function Cr'#i and the target value Cr'_cmd_f is obtained as shown in equation (17).

$$E''\#i(k) = Cr'\#i(k) - Cr'\_cmd\_f(k) \quad (17)$$

Next, the switching function σ"#1 is defined as shown in equation (18). The switching function σ"#1 defines the converging behavior of the deviation E"#i. Here, S" represents a disturbance suppressing response assignment parameter, and defines the converging speed of the deviation E"#i when disturbance is applied. The disturbance suppressing response assignment parameter S" is set in a range of $-1 < S'' < 0$.

$$\sigma''\#i(k) = E''\#i(k) + S'' \cdot E''\#i(k-1) \quad (18)$$

Lastly, a cylinder fuel correction coefficient KINJ#i is calculated as shown in equation (19). Here, Krch" and Kadp" are feedback gains.

$$KINJ \# i(k) = -Krch'' \cdot \sigma'' \# i(k) - Kadp'' \cdot \sum_{j=0}^{k} \sigma'' \# i(j) \quad (19)$$

Although specific embodiments of the present invention have been described, the invention is not limited to the embodiments. For example, the reference signal Fcr#i is not limited to the signal shown in FIG. 4, and may be of a triangular wave, a rectangular wave or a trapezoidal wave for example.

The invention claimed is:

1. An air/fuel ratio control apparatus for smoothening variation of air/fuel ratio among a plurality of cylinders of an internal combustion engine, comprising
   a sensor for measuring output of the internal combustion engine,
   means for calculating a correlation function of each cylinder by taking cross-correlation of values measured by the sensor and a reference signal for each cylinder, the reference signal being a periodic signal in which one combustion cycle of the internal combustion engine is one period,
   means for calculating a smoothing target value which is common for all of the cylinders, and
   cylinder controllers for producing control input to the respective cylinders such the correlation function converges to the smoothing target value.

2. The apparatus according to claim 1, wherein the cross-correlation is calculated in a section of an integral multiple of period of the reference signal.

3. The apparatus according to claim 1, wherein the smoothing target value is a mean value of the correlation function.

4. The apparatus according to claim 1, wherein the control input is produced using a two-degrees-of-freedom response assignment control algorithm.

5. The apparatus according to claim 1, further comprising common control means for producing a control input which is common to the cylinders such that the mean value of the sensor is converged to a predetermined output target value.

6. The apparatus according to claim 5, wherein the common control input is produced using a two-degrees-of-freedom response assignment control algorithm, and a target value response of the common control means is set higher than that of the cylinder controller.

7. The apparatus according to claim 1, wherein the internal combustion engine is a gasoline engine, the control input to each of the cylinders is a parameter for correcting a fuel injection amount, and the sensor is an exhaust gas sensor disposed in an exhaust system.

8. The apparatus according to claim 7, wherein ignition timing is corrected in accordance with the parameter.

9. The apparatus according to claim 8, wherein a correction amount of the ignition timing is proportional to magnitude of a load of the engine.

10. The apparatus according to claim 1, wherein the internal combustion engine is a diesel engine, the control input to each of the cylinders is a parameter for correcting a fuel injection amount, and the sensor is an angular speed sensor disposed on a crankshaft.

11. A method for smoothening variation of air/fuel ratio among a plurality of cylinders of an internal combustion engine, comprising
    measuring output of the engine,
    calculating a correlation function of each cylinder by taking cross-correlation of the measured values and a reference signal for each cylinder, the reference signal being a periodic signal in which one combustion cycle of the internal combustion engine is one period,
    calculating a smoothing target value which is common for all of the cylinders, and
    producing control input to the respective cylinders such the correlation function converges to the smoothing target value.

12. The method according to claim 11, wherein cross-correlation is calculated in a range of an integral multiple of period of the reference signal.

13. The method according to claim 11, wherein the smoothing target value is a mean value of the correlation function.

14. The method according to claim 11, wherein the control input is produced using a two-degrees-of-freedom response assignment control algorithm.

15. The method according to claim 11, further comprising producing a control input which is common to the cylinders such that the mean value of the measured values converges to a predetermined output target value.

16. The method according to claim 15, wherein the common control input is produced using a two-degrees-of-freedom response assignment control algorithm, and responsiveness of the common control is set higher than that of each cylinder.

17. The method according to claim 11, wherein the internal combustion engine is a gasoline engine, the control input to each of the cylinders is a parameter for correcting a fuel injection amount, and the output of the engine is measured with an exhaust gas sensor disposed in an exhaust system.

18. The method according to claim 17, wherein ignition timing is corrected in accordance with the parameter.

19. The method according to claim 18, wherein a correction amount of the ignition timing is proportional to magnitude of a load of the engine.

20. The apparatus according to claim 11, wherein the internal combustion engine is a diesel engine, the control input to each of the cylinders is a parameter for correcting a fuel injection amount, and the output of the engine is measured with an angular speed sensor disposed on a crankshaft.

* * * * *